(12) United States Patent
Uchinohae et al.

(10) Patent No.: US 11,909,247 B2
(45) Date of Patent: Feb. 20, 2024

(54) SEMICONDUCTOR DEVICE FOR CONTROLLING A CHARGE OF A BATTERY CELL

(71) Applicant: RENESAS ELECTRONICS CORPORATION, Tokyo (JP)

(72) Inventors: Hironori Uchinohae, Tokyo (JP); Youhei Kengoyama, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 261 days.

(21) Appl. No.: 16/905,119

(22) Filed: Jun. 18, 2020

(65) Prior Publication Data

US 2021/0021145 A1    Jan. 21, 2021

(30) Foreign Application Priority Data

Jul. 18, 2019   (JP) .................................. 2019-132492

(51) Int. Cl.
*H02J 7/00* (2006.01)
*H01M 10/42* (2006.01)

(52) U.S. Cl.
CPC .... *H02J 7/007194* (2020.01); *H02J 7/00714* (2020.01); *H02J 7/007182* (2020.01); *H01M 2010/4271* (2013.01)

(58) Field of Classification Search
CPC ................................................. H02J 7/007194
See application file for complete search history.

(56) References Cited

U.S. PATENT DOCUMENTS

| 5,596,259 | A | 1/1997 | Mino et al. |
| 9,541,975 | B2 | 1/2017 | Ukai et al. |
| 2007/0075682 | A1* | 4/2007 | Guang ................ H02J 7/00712 320/128 |
| 2010/0231177 | A1* | 9/2010 | Ashida ................. H02J 7/0031 429/61 |
| 2015/0058654 | A1* | 2/2015 | Ukai ......................... G06F 1/28 713/340 |

FOREIGN PATENT DOCUMENTS

| CN | 104160580 | A | * | 11/2014 | ............. B60L 53/14 |
| JP | 07-240235 | A | | 9/1995 | |
| JP | 09-19073 | A | | 1/1997 | |
| JP | 2014117068 | A | * | 6/2014 | ............. Y02E 60/10 |
| JP | 2017-204485 | A | | 11/2017 | |

OTHER PUBLICATIONS

Rand et al. "Lead-Acid Batteries for Future Automobiles", 2017, pp. 97-132. (Year: 2017).*

(Continued)

*Primary Examiner* — Drew A Dunn
*Assistant Examiner* — Pamela J Jeppson
(74) *Attorney, Agent, or Firm* — Rimon P.C.

(57) ABSTRACT

Semiconductor device includes a controller for controlling a charging of a battery cell. When the battery cell is charged, the controller generates a voltage command value which instructs to a charger so that an upper limit value of an output voltage output from the charger is higher than a predetermined voltage which is a maximum potential voltage that the battery cell can be charged maximally.

7 Claims, 11 Drawing Sheets

(56) References Cited

OTHER PUBLICATIONS

Kuwano Y et al. CN-104160580-A Machine Translation Nov. 2014 (Year: 2014).*
Hiroyoshi Y et al. JP-2014117068-A Machine Translation Jun. 2014 (Year: 2014).*
Remy Technical Bulletin, "Voltage Drop: Solving the Root Causes of Charging System Failures" (Dec. 2015) (Year: 2015).*
Japanese Notice of Reasons for Refusal issued in corresponding Japanese Patent Application No. 2019-132492, dated Nov. 15, 2022, with English translation.
Japanese Notice of Reasons for Refusal issued in corresponding Japanese Patent Application No. 2019-132492, dated May 30, 2023, with English translation.

* cited by examiner

ACTUAL BATTERY VOLTAGE WAVEFORM

FIG. 11B

IDEAL BATTERY VOLTAGE WAVEFORM

SEMICONDUCTOR DEVICE FOR CONTROLLING A CHARGE OF A BATTERY CELL

CROSS-REFERENCE TO RELATED APPLICATIONS

The disclosure of Japanese Patent Application No. 2019-132492 filed on Jul. 18, 2019 including the specification, drawings and abstract is incorporated herein by reference in its entirety.

BACKGROUND

The present disclosure relates to a semiconductor device. A battery pack is mounted in applications such as a notebook PC, a tablet terminal, a smart phone, and a digital camera. The battery pack, semiconductor device of a battery control IC (FGIC: Fuel Gauge IC) for performing charge/discharge control or the like is provided. For example, Japanese Unexamined Patent Application Publication No. 2017-204485 discloses a battery pack incorporating such battery control IC. Fully charged is a state in which the battery cell is charged to a voltage near the maximum potential MaxV that can be charged. In a typical charging scheme, first, constant current charging is performed until an output voltage of a charger reaches MaxV. Thereafter, in order to prevent overvoltage, the output voltage of the charger is set to MaxV, constant voltage charging is performed until the voltage CellV of the battery cell becomes a voltage near the desired MaxV.

SUMMARY

During the constant voltage period, the output current is determined by the potential difference between the output voltage (MaxV) of the charger and an internal voltage of the battery cell CellINV. A voltage drop occurs due to a path impedance from the charger to the battery cell. When charging with the output voltage set to MaxV, the battery cell voltage Vcell becomes less than MaxV. Consequently, the battery cell voltage does not reach the maximum potential MaxV, and the output current is less than the maximum current in a safe range. Therefore, the charging time becomes longer.

Other objects and novel features will become apparent from the description of this specification and the accompanying drawings.

Semiconductor devices of a plurality of embodiments are described in this specification. A one semiconductor device of one embodiment will be described as follows.

A semiconductor device comprises a controller configured to control a charging of a battery cell. The controller generates a voltage command value which instructs to a charger so that an upper limit value of an output voltage output from the charger is higher than a predetermined voltage which is a maximum potential voltage that the battery cell can be charged maximally.

DETAILED DESCRIPTION

Supplementary Information on Problems

Figure 9:
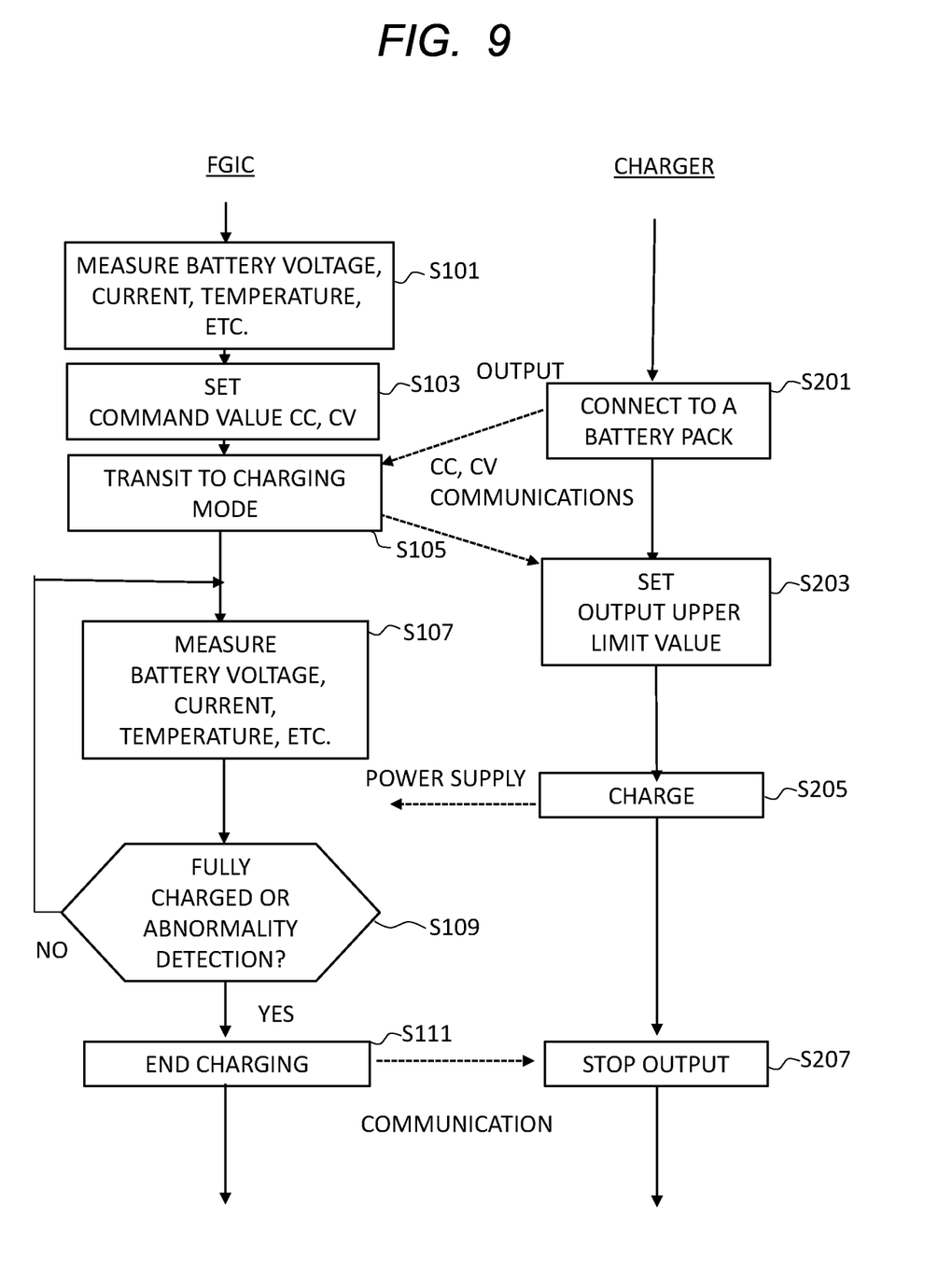
FIG. 9 is an explanatory view showing an example of a process related to a conventional battery cell charging.

Prior to the description of present embodiment, the process of charging a conventional battery pack will be described. FIG. 9 is an explanatory view illustrating an example of a process related to charging of a conventional battery pack. In FIG. 9, an operation of a FGIC (semiconductor device) 20 and a charger 90 in the battery pack are shown, respectively.

In step S101, the FGIC 20 measures a voltage of the battery cell, a current in a battery pack 100 (including the output current), a temperature in the battery pack 100, and the like. Note that the temperature measurement in the battery pack 100 includes temperature measurement of the battery cell.

In the step S103, the FGIC 20 sets a command value CC for defining the upper limit value of the output current Iout supplied from the charger 90 to the battery cell (Charging Current; current command value), and a command value CV for defining the upper limit value of the output voltage Vout (Charging Voltage; voltage command value) based on a voltage, a current and a temperature or the like measured in a step S101 respectively. Generally, the command value CV of the output voltage Vout is set to MaxV. In the meantime, the charger 90 transmits a connection confirming signal via a communication such as SMBus communication. Thus, the charger 90 confirms the connection status with the battery pack (step S201).

When the battery pack 100 connects to the charger 90, the battery pack 100 transmits a response signal to the connection confirming signal via communication means. Thus, when the battery pack 100 and the charger 90 is connected to transit to the charging mode, FGIC 20 transmits the output current command value CC and the output voltage command value CV set in the step S103 to the charger 90 (step S105).

The charger 90 sets the upper limit value of the output current and the output voltage for charging based on the command value CC and CV received from the battery pack 100 respectively (step S203). Then, the charger 90 charges the battery pack based on the upper limit value set in the step S203 (step S205).

During charging, FGIC 20 measures the battery cell voltage Vcell, the charging current Ic flowing in the battery pack 100, the temperature in the battery pack 100, and the like (step S107).

Then, in the step S109, FGIC 20 judges whether the battery cell is in a fully charged state, and whether an anomaly during charging is detected based on the battery cell voltage Vcell, the charging current Ic, and the temperature measured in the step S107. If the battery cell is not fully charged and no anomaly is detected, FGIC 20 performs the process of step S107 again. That is, in this case, charging of the battery pack 100 continues.

On the other hand, if the battery cell is in a fully charged state or if an anomaly is detected (Yes), FGIC 20 ends charging the battery pack 100 (step S111). For example, FGIC 20 sends an end of charge signal to the charger 90 that ends charging to the battery pack 100. Upon receiving the charge end signal, the charger 90 stops supplying power to the battery pack 100 and terminates charging (step S207).

Figure 10:
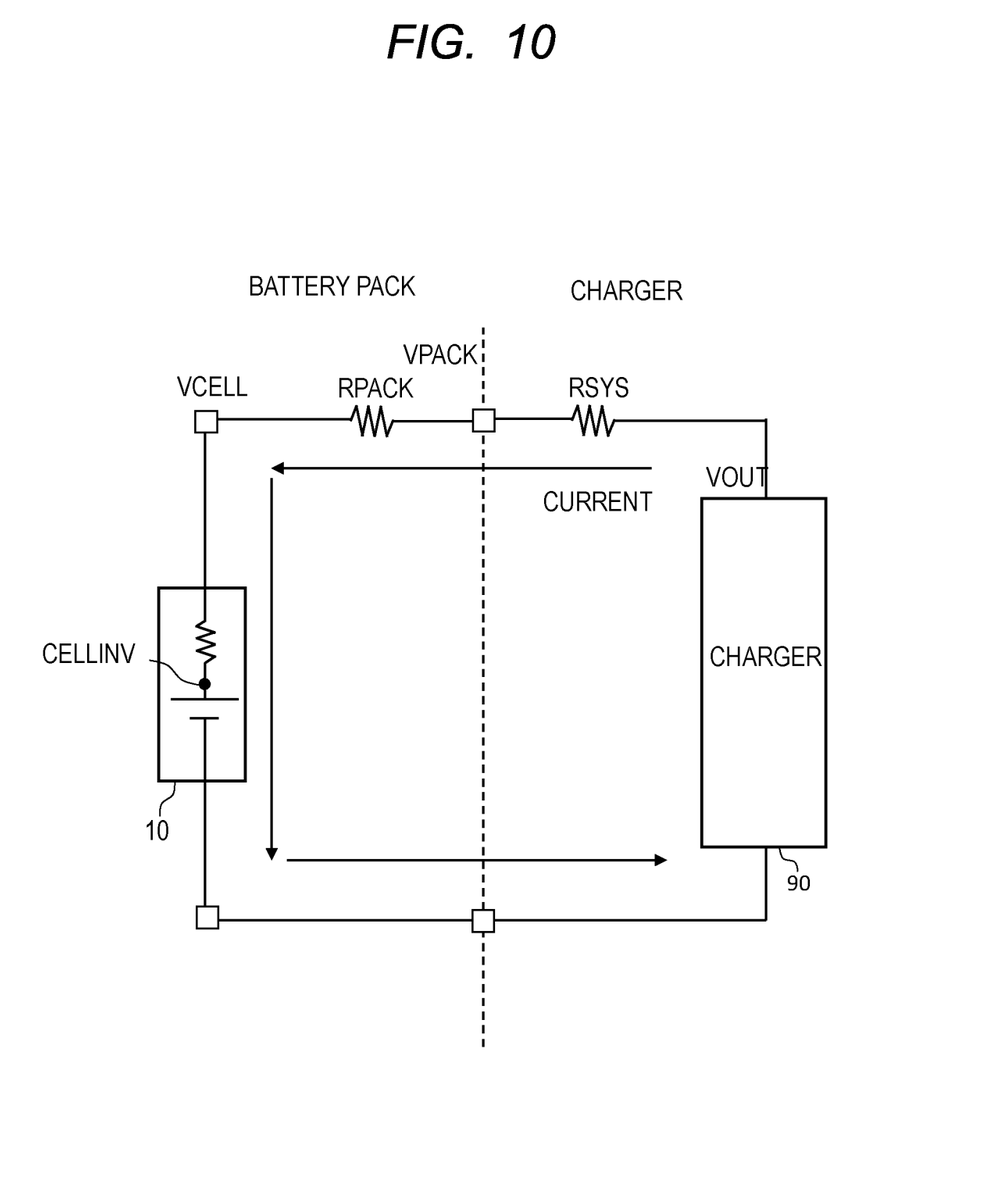
FIG. 10 is a diagram illustrating the path impedance between the charger and the battery cell.
Figure 11A:
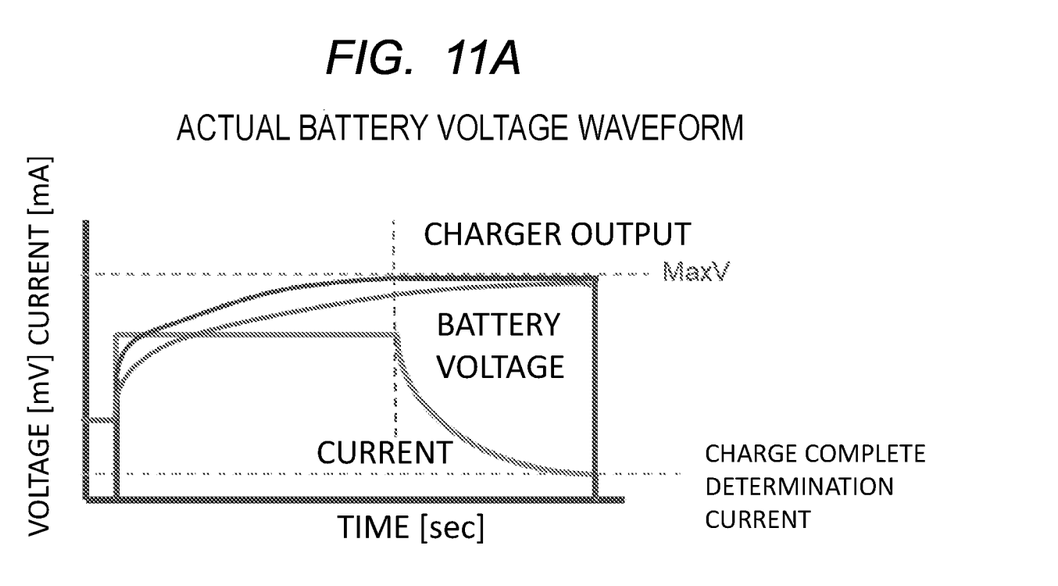
FIGS. 11A and 11B are diagrams showing a charging voltage of the battery pack, the voltage of the battery cell, and the charging current at the time of charging.
Figure 11B:
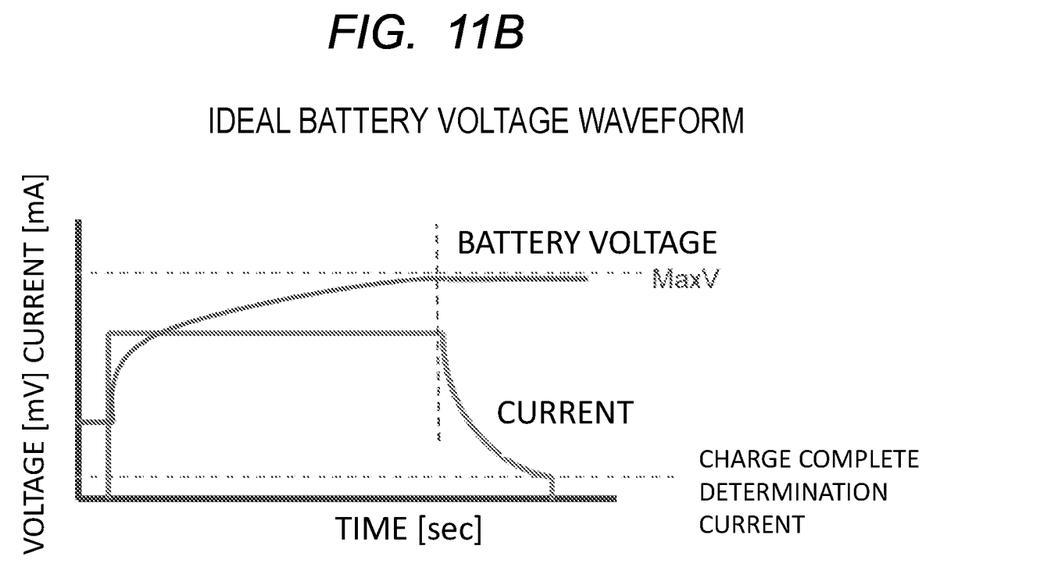

FIG. 10 is a diagram illustrating the path impedance between the charger and the battery cell. FIGS. 11A and 11B are diagrams illustrating the output voltage, the battery cell voltage, and the output current at the time of charging the battery pack. FIG. 11A shows a waveform of the conventional actual voltage and current, and FIG. 11B shows a waveform of the ideal voltage and current.

As shown in FIG. 10, there are two path impedance in the charging path. The path impedance (first path impedance) Rsys from the charger 90 to the end of the battery pack 100 and the path impedance (second path impedance) Rpack from the end of the battery pack 100 to the battery cell. Therefore, in the charging path, a voltage drop IR-Drop occurs due to the path impedance Rsys, and Rpack. However, in the conventional charging method, the command value CV has been set without considering the voltage drop IR-Drop due to the path impedance. Therefore, as shown in FIG. 11A the battery cell voltage is shifted from the constant current charge to the constant voltage charge at time T1 in a state of being considerably lower than MaxV. In the constant voltage charging, since the output current is reduced, as compared with the ideal waveform as shown in FIG. 11B, the charging time becomes longer.

First Embodiment

Hereinafter, embodiments of the present invention are described in detail with reference to the drawings. In all the drawings for explaining the embodiments, the same portions are denoted by the same reference numerals in principle, and repetitive descriptions thereof are omitted.

Configuration of Battery Pack

Figure 1:
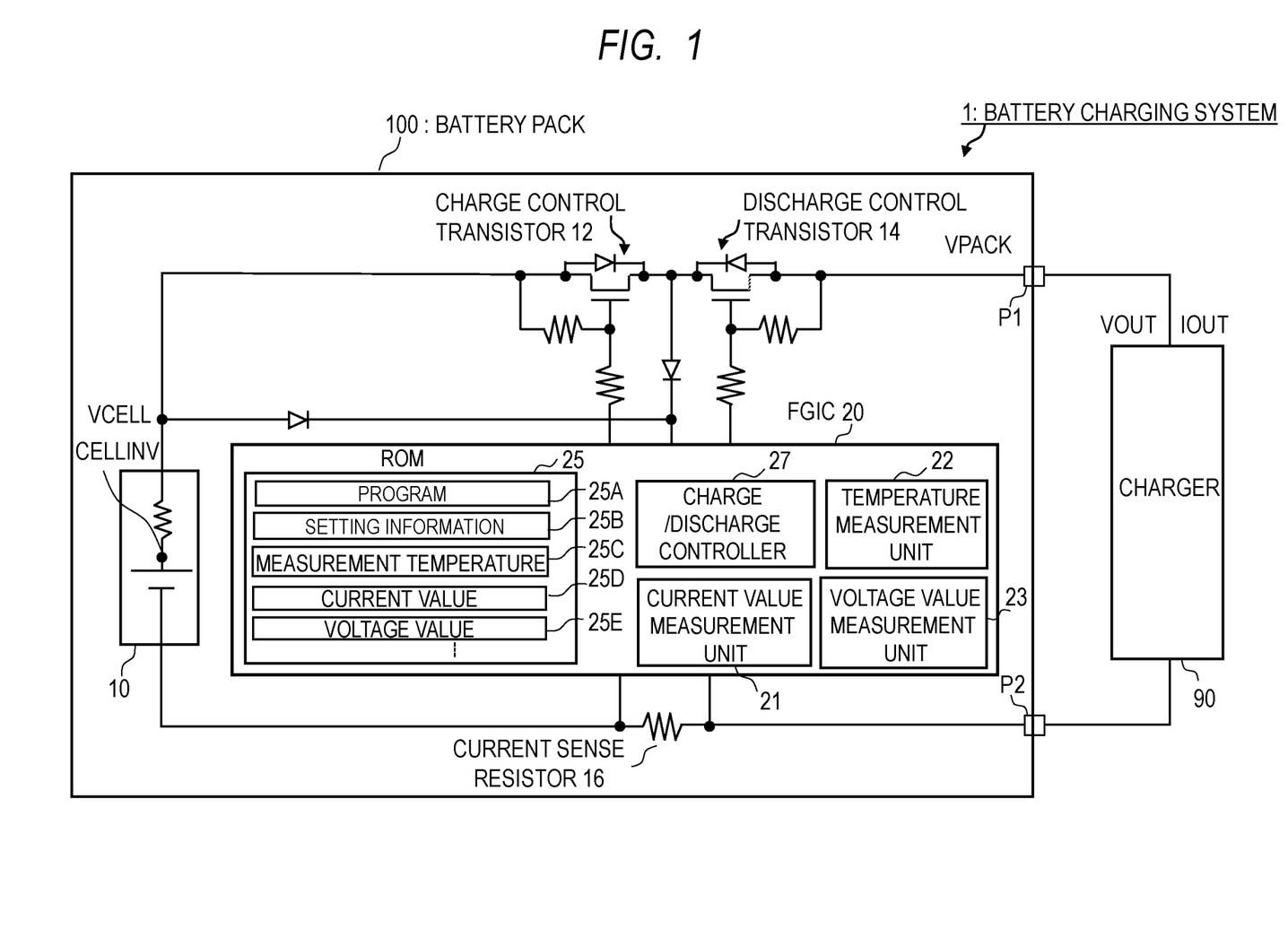
FIG. 1 is a diagram illustrating an exemplary configuration of a battery charger system according to an embodiment of a first embodiment.

FIG. 1 shows an exemplary configuration of a battery recharging system 1 according to the first embodiment. As shown in FIG. 1, the battery charging system 1 includes a battery pack 100, a battery cell 10, a charge control transistor 12, a discharge control transistor 14, a current sense resistor 16, a FGIC 20, and the like.

During charging of the battery cell 10, the battery pack 100 is connected to the charger 90 through the positive end P1 and the negative end P2, and power for charging is supplied from the charger 90.

The battery cell 10 is constituted by a secondary battery such as a lithium ion battery. The battery cell 10 may be composed of a plurality of cells, or may be composed of only a single cell. FIG. 1 illustrates a battery cell 10 formed of a single cell. Each cell has a cell body and an internal resistance. Vcell of FIG. 1 is the voltage between the terminals of the battery cell 10. In the following, Vcell is also referred to as a battery cell voltage. Further, CellINV of FIG. 1 is the internal voltage of the battery cell 10. In FIG. 1, the battery cell voltage Vcell is a voltage drop from the internal voltage CellINV by the internal resistance of the cell.

The charge control transistor 12 is a circuit element that mainly performs current control during charging of the battery cell 10. The charge control transistor 12, for example, is constituted by a field-effect transistor such as a NMOS. A gate of the charge control transistor 12 is connected to FGIC 20 as shown in FIG. 1. The charge control transistor 12 is switched on/off by a gate voltage control from FGIC 20.

The discharge control transistor 14 is a circuit element that controls a current during discharge of the battery cell 10, that is, during power supply to a load (not shown). The discharge control transistor 14 is constituted by a field-effect transistor such as a NMOS. A gate of the discharge control transistor 14 is connected to FGIC 20. The discharge control transistor 14 is switched on/off by a gate voltage control from FGIC 20.

The current sense resistor 16 is a circuit element for detecting current flowing into the battery pack 100. The current sense resistor 16 is connected to FGIC 20, and a current is measured by the current value measurement unit 21 in FGIC 20.

FGIC 20, as shown in FIG. 1, the current value measurement unit 21, the voltage value measurement unit 23, the temperature measurement unit 22, ROM (Read Only Memory) 25, a charge/discharge controller (Controller) 27 and the like.

The current value measurement unit 21 is a functional block for measuring the current value of the current flowing through the current sense resistor 16. The current value measurement unit 21 includes, for example, a current value measurement circuit and an AD converter. The current value measurement unit 21 digitally converts the current value measured by the current value measurement circuit by the AD converter, and outputs a digitized current value. The measured current value is used for calculation in the charge/discharge controller 27. The current value is stored in the ROM 25.

The voltage value measurement unit 23 is, for example, a functional block for measuring a voltage such as an end voltage Vpack or a battery cell voltage Vcell of the battery pack 100. When the battery cell 10 is composed of a plurality of cells, the voltage value measurement unit 23 may measure the voltage for each cell. The voltage value measurement unit 23 includes, for example, a voltage value measurement circuit and an AD converter. The voltage value measurement unit 23 digitally converts the voltage value measured by the voltage value measurement circuit in the AD converter, and outputs a digitized voltage value. The measured voltage value is used for calculation in the charge/discharge controller 27. The voltage is stored in the ROM 25.

The temperature measuring unit 22 is a functional block that measures the temperature in the battery pack 100 such as the battery cell 10. The temperature measurement unit 22, for example, a temperature sensor (e.g., resistance for temperature measurement), a temperature measurement circuit, an AD converter or the like. The temperature measurement unit 22 includes, for example, a temperature table or a temperature function in which the resistance value of the temperature measurement resistance is associated with the temperature, and measures the temperature in the battery pack 100 using the resistance value of the temperature measurement resistance measured by the temperature measurement circuit. The measured temperature information is used, for example, to detect an anomaly in a high-temperature state of the battery cell 10. When the high temperature state is detected, the charge and discharge are stopped by the charge/discharge controller 27.

The ROM 25 stores various types of information such as operation programs and setting information related to the battery pack 100. ROM 25 may be comprised of a flash memory or a register or the like, or a configuration in which these are combined. As shown in FIG. 1, The ROM 25, for example, has a respective memory area for storing a program 25A related to the control of the battery pack 100, a setting information 25B, a measurement temperature 25C, the measurement current value 25D, and the measurement voltage value 25E or the like.

The ROM 25 stores a path impedance (first path impedance) Rsys and a path impedance (second path impedance) Rpack as setting data 25B. The ROM 25 further stores command values CC and CV to the charger 90 as the setting data 25B, respectively. As the command value CC, for example, a predetermined value of the output current allowed at the time of constant current charging is stored. Further, as the charge voltage CV, for example, the value of the maximum potential MaxV of the battery cell 10 is stored. During charging, these values may be temporarily stored in a RAM (not shown) or the like.

The charge/discharge controller 27 is a functional block for controlling processes related to charging and discharging of the battery cell 10. When charging the battery cell 10, the charge/discharge controller 27 controls each unit in the battery pack 100 according to a flow such as FIG. 9 and FIG. 2 to be described later, for example. Further, the charge/discharge controller 27 sets the command values CC and CV, determines whether or not to continue charging or the like based on the current value by the current value measurement unit 21, the voltage value by the voltage value measurement unit 23, the temperature value by the temperature measurement unit 22.

The charge/discharge controller 27 is composed of, for example, a processor such as a CPU, an individual circuit for realizing each functional block, and the like. In addition, FGIC 20 may be composed of FPGA (Field-Programmable Gate Array) or ASIC (Application Specific Integrated Circuit). FGIC 20 may be configured by combining them.

How to Charge the Battery Pack in the Present Embodiment

Figure 2:
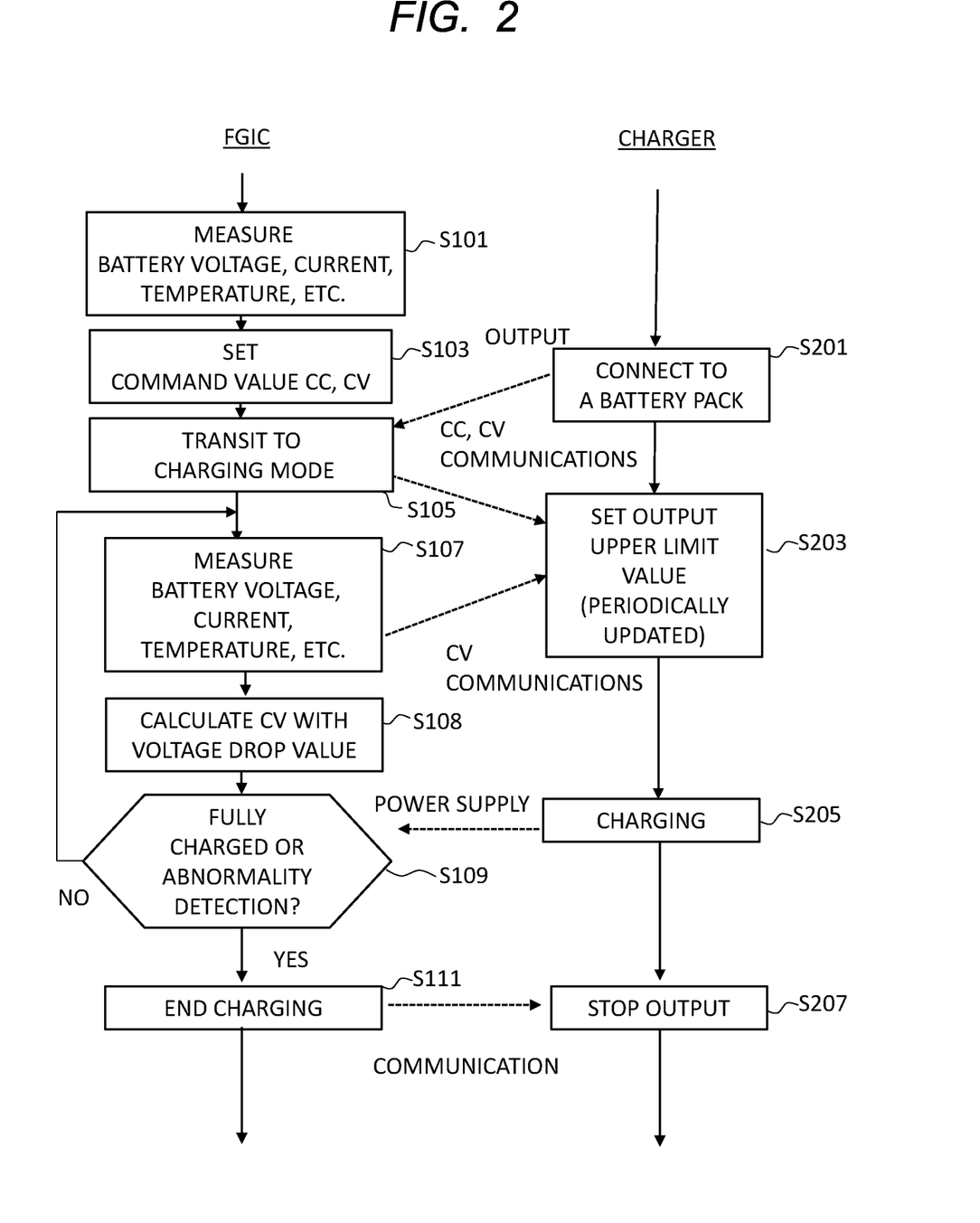
FIG. 2 is an explanatory view showing an exemplary process related to charging the battery charging system according to the first embodiment.

FIG. 2 is an explanatory diagram showing an exemplary process related to the charge of the battery pack according to the first embodiment. FIG. 2 is similar to FIG. 9 previously described. Therefore, in FIG. 2, the same reference numerals are assigned to the steps for performing the same processing as in FIG. 9. The following description focuses on processing different from that of FIG. 9.

In FIG. 2, a step S108 is added to the battery pack 100 with respect to FIG. 9. The process in the step S203 is partly different from that in FIG. 9.

In the step S108, the command value CV considering the voltage drop IR-Drop due to the path impedance is set. Specifically, the charge/discharge controller 27 generates the command value CV that instructs the maximum value of the output voltage Vout output from the charger 90 to be a predetermined voltage higher than the maximum potential MaxV that the battery cell 10 can be charged maximally.

The charge/discharge controller 27 sets the command value CV again based on the voltage of the battery cell 10 measured in the step S107 and the charge current Ic in the battery pack 100. For example, when the battery cell voltage Vcell is lower than the desired voltage, the charge/discharge controller 27 sets the value of the command value CV of the output voltage Vout again to a value higher than the current value. At this time, the charge/discharge controller 27 may vary the command value CV at a predetermined width defined in advance, may be varied while referring to the respective values measured in the step S107. The charge/discharge controller 27 transmits the command value CV that is reset to the charger 90.

In step S203, upon receiving the reconfigured command value CV from FGIC 20, the charger 90 updates the upper limit value of the output voltage Vout, from MaxV to the received charge voltage CV. At the time of constant voltage charging, the charger 90 supplies the output voltage Vout based on the upper limit value that is reset to the battery pack 100 (step S205).

During the charge, the process of step S107-S108 is repeatedly executed. In response to this, the command value CV is periodically updated in step S203.

Main Effects of the Present Embodiment

According to the present embodiment, the command value CV of the output voltage Vout of the charger 90 is set to a value that takes into account the voltage drop due to the path impedance. According to this configuration, during the constant voltage charging, since the voltage of the output voltage Vout is maintained at a value greater than MaxV, even if the battery cell voltage Vcell becomes close to MaxV, it is possible to maintain a state in which the potential difference between the output voltage Vout and the battery cell Vcell is large. Thus, it is possible to increase the charging current Ic, as a result, it is possible to shorten the charging time. In other words, it is possible to extend the timing of shifting from the constant current charging to the constant voltage charging, maximize the output current in a safe range, to shorten the charging time.

Further, according to present embodiment, since the command value CV is set so that the battery cell voltage Vcell does not exceed MaxV, safety at the time of charging is ensured.

Second Embodiment

Next, the second embodiment will be described. Present embodiment describes how to set the command value CV of the output voltage Vout while updating the path impedance Rpack, Rsys.

Figure 3:
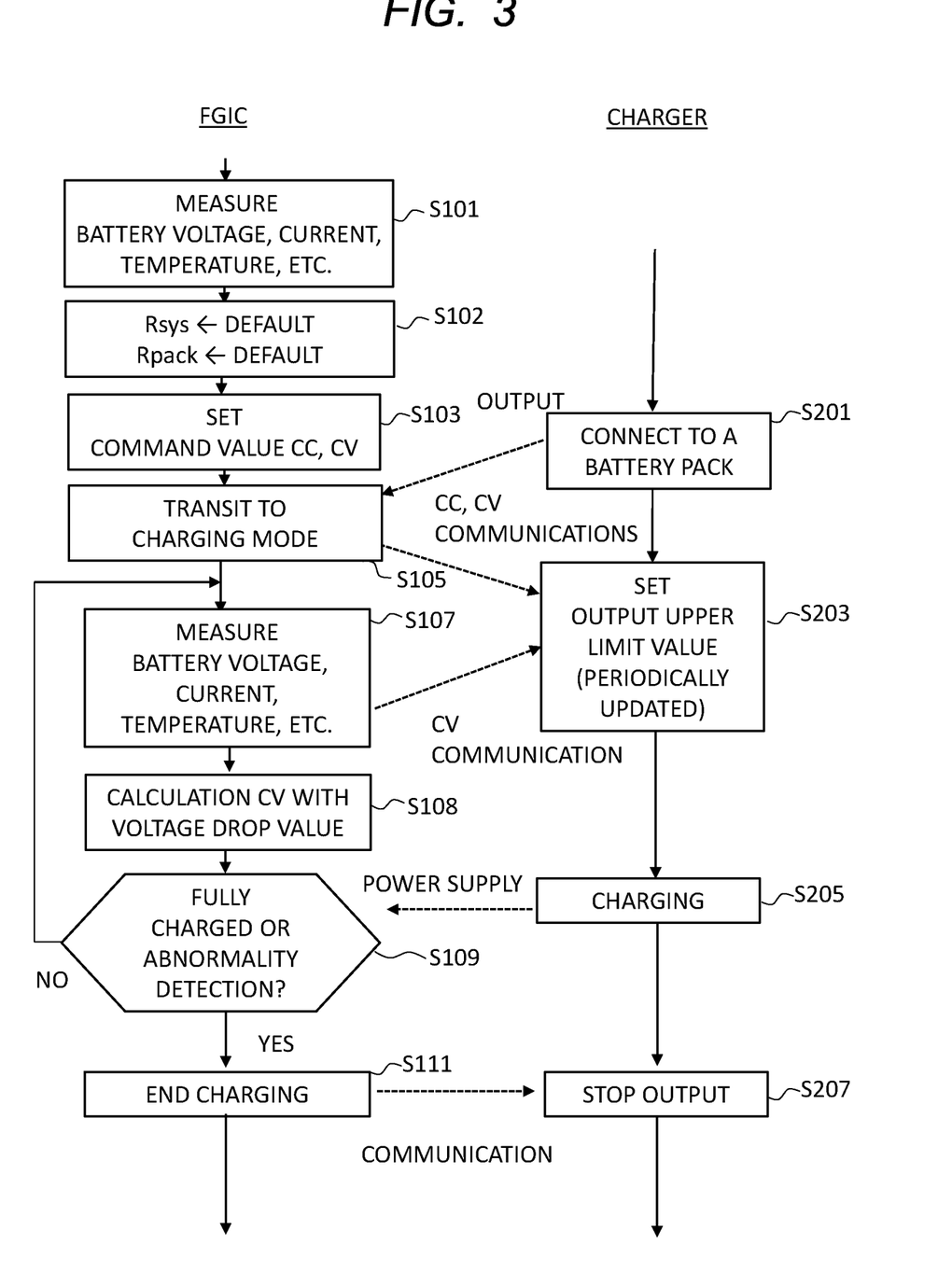
FIG. 3 is an explanatory view showing an exemplary process related to charging the battery charging system according to a second embodiment.

FIG. 3 is an explanatory diagram showing an exemplary process related to the charge of the battery pack according to the second embodiment. FIG. 3 is similar to FIG. 2 and differs from FIG. 2 in that a step S102 is added between steps S101-S103.

In step S102, initialization values preset in the path impedances Rsys, Rpack are set. This setting is performed only once after FGIC 20 is started. The path impedances Rsys, Rpack are measured by, for example, methods shown in FIG. 4, which will be described later. The measured path impedance Rsys, Rpack may be stored in ROM 25 as an initial value, or may be temporarily stored in a random access memory RAM (not shown).

In step S103, the same processes in FIGS. 2 and 9 may be performed, or the command values CC and CV may be calculated using the initialization values of the path impedances Rsys, Rpack set in step S102. The command value CV, by the equation (3) described later, is calculated in the charge/discharge controller 27. In step S105, the command value CV calculated here is transmitted to the charger 90.

Figure 4:
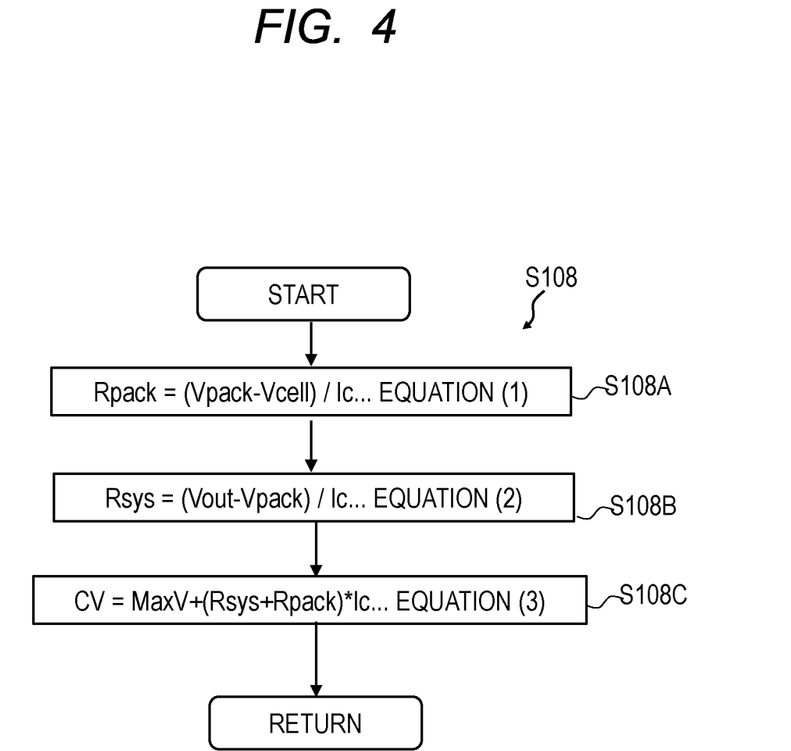
FIG. 4 is a flow chart showing an example of a method of calculating a command value of the path impedance and the output voltage according to the second embodiment.

In present embodiment step S108, the processes shown in FIG. 4 are executed. FIG. 4 is a flowchart showing an exemplary method of calculating command values of path impedances and output voltage according to the second embodiment. FIG. 4 includes a steps S108a, S108b, and S108c. In step S108a, the path impedance Rpack from the end of the battery pack 100 to the battery cell is calculated. Specifically, the charge/discharge controller 27 uses the end voltage Vpack of the battery pack 100, the battery cell voltage Vcell, and the charge current Ic to calculate the path impedance Rpack by the equation (1) of FIG. 4.

In step S108b, the path impedance Rsys from the charger 90 to the end of the battery pack 100 is calculated. Specifically, the charge/discharge controller 27 uses the output voltage Vout of the charger 90, the end voltage Vpack of the battery pack 100, and the charge current Ic to calculate the path impedance Rsys by a equation (2) of FIG. 4. The output voltage Vout may be received from the charger 90 via communication means.

In the step S108c, the charge/discharge controller 27 adds the respective path impedance Rpack, Rsys calculated in the steps S108a and S108b to calculate the path impedance (Rpack+Rsys) from the charger 90 to the battery cell 10. Then, the charge/discharge controller 27 calculates the command value CV of the output voltage Vout by the equation (3) of FIG. 4 using the path impedances (Rpack+Rsys), and charge current Ic or the like. Thus, in present embodiment, the charge/discharge controller 27 calculates the command value CV considering the voltage drop IR-Drop using the calculated path impedance Rpack, Rsys, and the charge current Ic. In other words, the command value CV is set to a value corresponding to the voltage obtained by adding the maximum chargeable voltage MaxV of the battery cell 10 and the voltage drop due to the path impedance Rpack, Rsys from the charger 90 to the battery cell 10. The other processing is the same as that of the above-described embodiment.

In the step S108, only one of the path impedances Rpack, Rsys may be measured. In other words, only one of the steps S108a, S108b of FIG. 4 may be executed. For the path impedances not calculated in step S108, the process of step S108c is performed using, for example, the initialization value set in step S102, the value calculated in the previous step S108, and the like.

Alternatively, S108b, S108c of steps may be integrated to directly calculate the combined resistivity of the path impedances Rpack, Rsys. Specifically, the charge/discharge controller 27 calculates the combined resistance value (Rpack+Rsys) using the output voltage Vout (command value CV), the battery cell voltage Vcell, and the charge current Ic.

Main Effects of the Present Embodiment

According to present embodiment, the path impedance Rpack, Rsys measured for each cycle, using the charging current Ic, the command value CV of the output voltage Vout is set. According to this configuration, it is possible to adjust the voltage applied to the battery cell 10 to a more appropriate value.

Third Embodiment

Next, the third embodiment will be described. In present embodiment, the path impedance Rsys from the charger 90 to the end of the battery pack 100 is updated only if it is a constant voltage charge.

Figure 5:
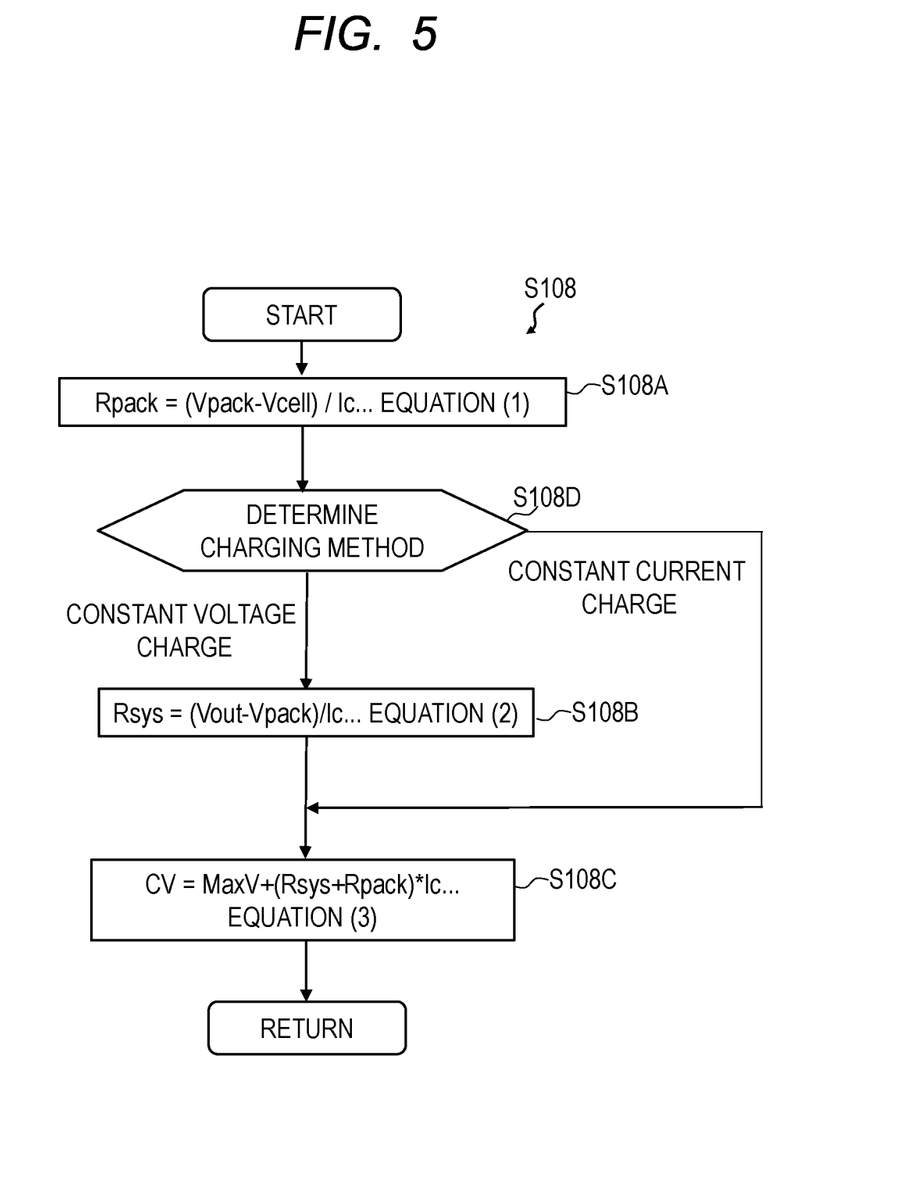
FIG. 5 is a flow chart showing an example of a method of calculating a command value of the path impedance and the output voltage according to a third embodiment.

FIG. 5 is a flowchart showing an exemplary method of calculating command values of path impedances and the output voltage according to the third embodiment. The step S108 of present embodiment shown in FIG. 5 is similar to that of FIG. 4, and differs from that of FIG. 4 in that a step S108d is added between the steps S108a-S801b.

In the step S108d, the charging method is determined to be either a constant current charge or a constant voltage charge. This determination is performed using the charge current Ic or the like measured in step S107. The charge/discharge controller determines by comparing the command value CC minus the charge current Ic of the output current Iout of the charger 90, and the threshold current Ith. Here, the threshold current Ith is a reference value for determining whether the constant current charge or constant voltage charge.

The charge/discharge controller 27, first, calculates the value of the command value CC minus charging current Ic. Then, the charge/discharge controller 27 compares the calculated value obtained by subtracting the charging current Ic from the command value CC, and the threshold current Ith. As a result of comparing these, when satisfying the relationship of the following equation (4), the charge/discharge controller 27 judges the charging current Ic is reducing and it is the constant voltage charge. Thereafter, the charge-discharge control unit 27 sequentially performs the process of the step S108b, S108c.

That is, when it is judged to be the constant voltage charge, the path impedance Rsys from the charger 90 to the end of the battery pack 100 is calculated again, and the command value CV is updated using the recalculated path impedances Rpack, Rsys.

$$\text{Command value } CC - \text{Charge current } Ic > \text{Threshold current } Ith \qquad \text{equation (4)}$$

In contrast, if it does not satisfy the relationship of Equation (4), the charge/discharge controller 27 judges the charging current Ic is not reducing and it is the constant current charge. After that, the charge/discharge controller 27 performs only the process of S108c.

That is, when it is determined to be the constant current charge, the path impedance Rsys from the charger 90 to the end of the battery pack 100 is not recalculated, and the command value CV is updated using, for example, the initial value of the path impedance Rsys already described and the path impedance Rpack calculated by the step S108a.

Upon determination in the step S108d, the charge/discharge controller 27 may compare the value obtained by subtracting the charging current Ic from the command value CC, and the threshold current Ith many times, and may judge to be the constant voltage when the relationship of equation (4) is continuously satisfied for a predetermined time. Further, the charge/discharge controller 27 may compare the value obtained by subtracting the charging current Ic from the command value CC, and the threshold current Ith many times, and may judge to be the constant voltage when the relationship of equation (4) is continuously satisfied by a predetermined ratio or more.

Main Effects of the Present Embodiment

According to present embodiment, updating of the path impedance Rsys is performed only when it is determined that the constant voltage charge. According to this configuration of the present embodiment, when measuring the path impedance Rsys, the output voltage Vout is replaced with a command value CV. According to this configuration, even if it is not possible to measure the output voltage Vout directly at FGIC 20, it is possible to measure the path impedance Rsys.

Fourth Embodiment

Next, the fourth embodiment will be described. In present embodiment, the method of estimating the charge current Ic from the start to the end of charging and the variation of the output current Vout prior to charging, and method of updating the command values CC, CV based on the estimation result will be described.

Figure 6:
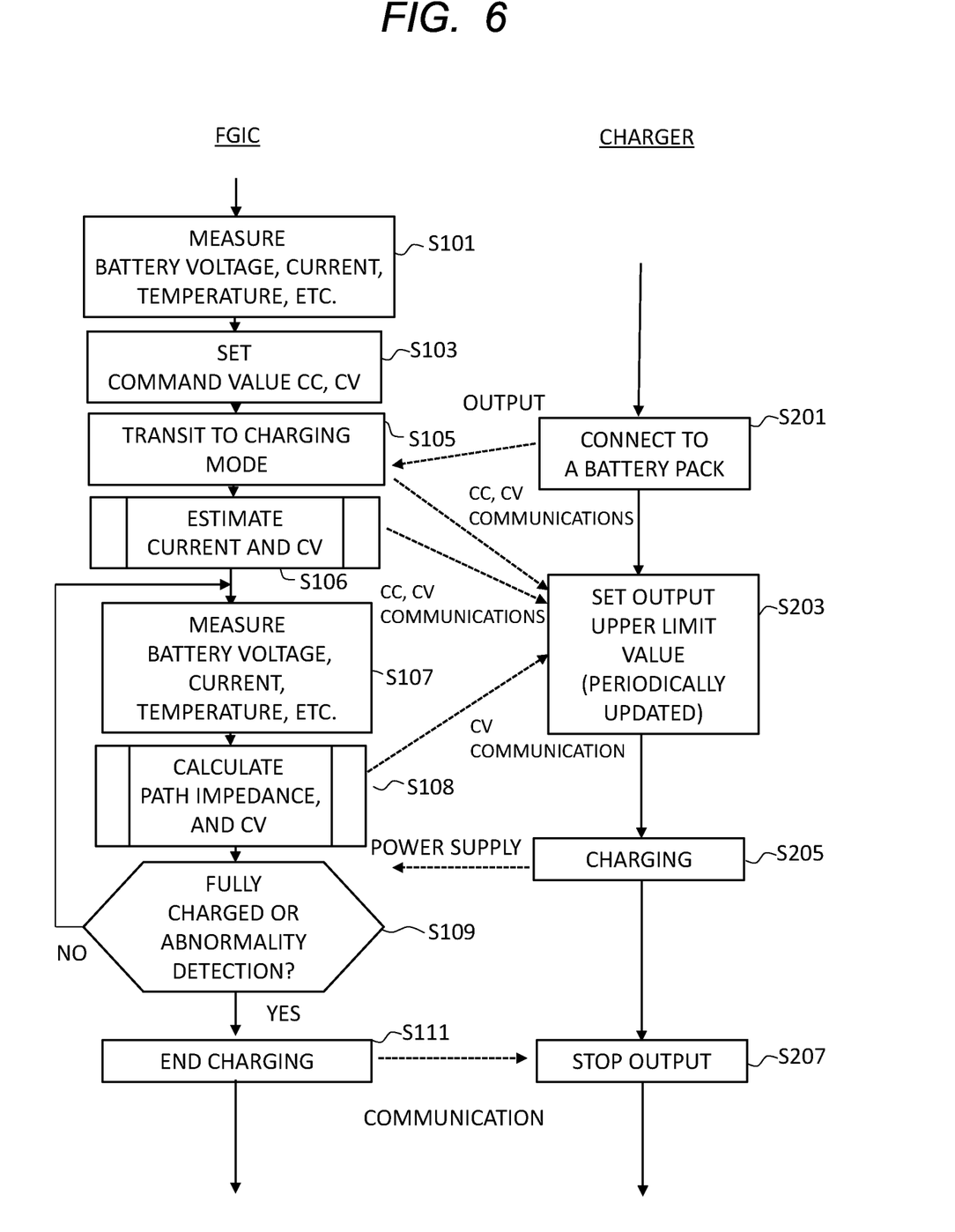
FIG. 6 is an explanatory view showing an exemplary process related to charging the battery pack according to a fourth embodiment.
Figure 7:
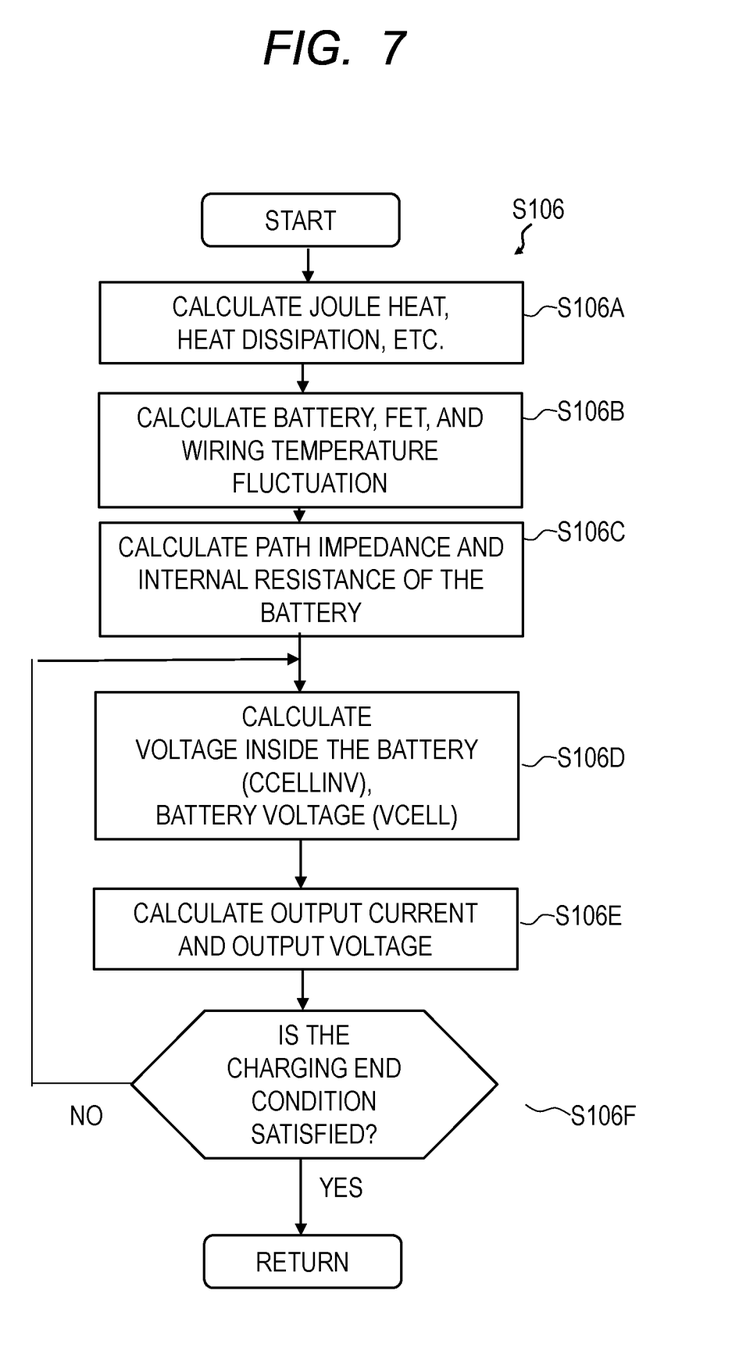
FIG. 7 is a flow chart showing details of the step S106 of FIG. 6.
Figure 8A:
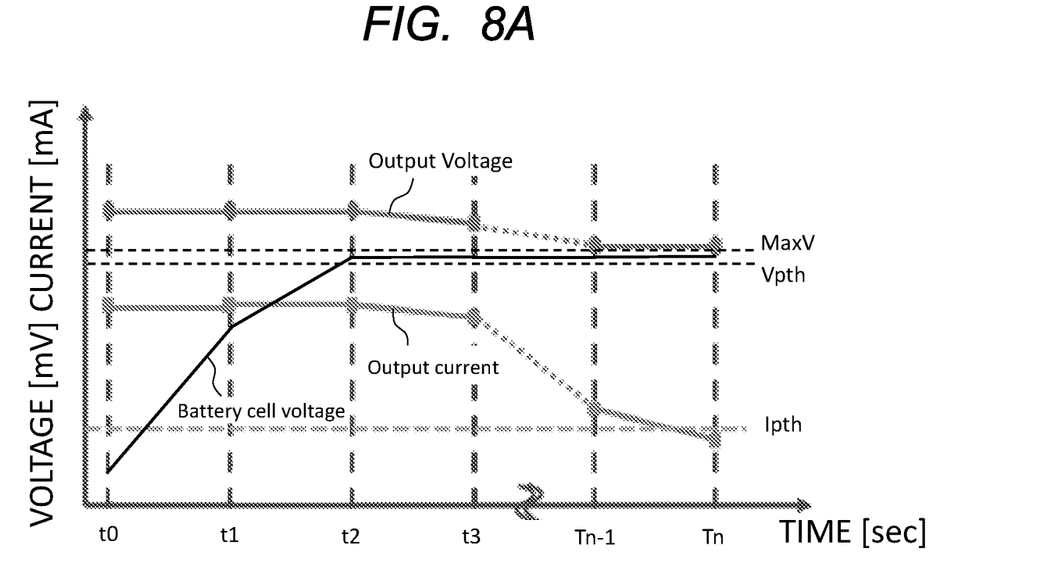
FIGS. 8A and 8B are diagrams showing an exemplary calculation in the step S106.
Figure 8B:
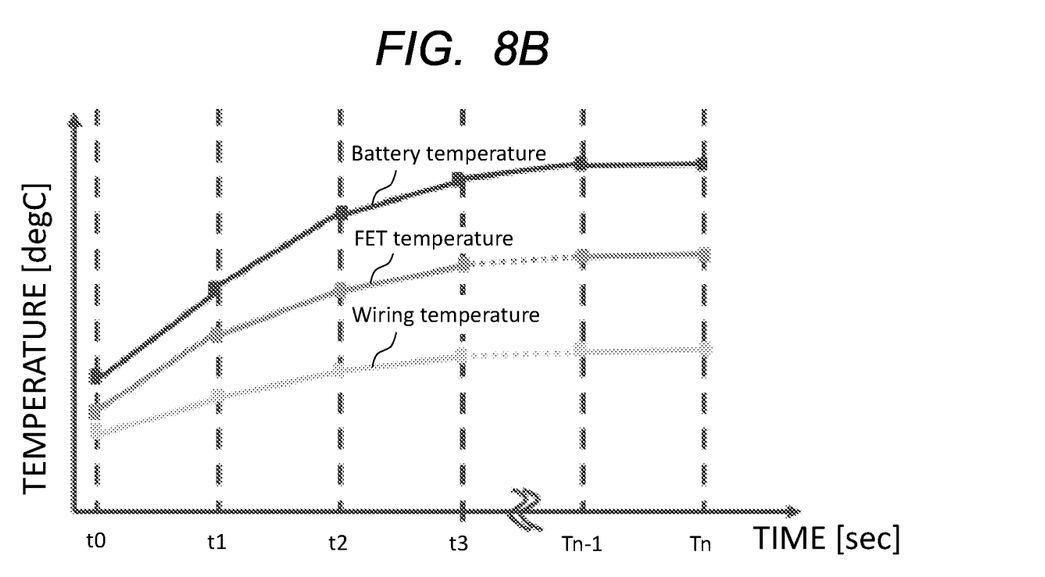

FIG. 6 is an explanatory diagram showing an exemplary process related to charging the battery pack according to the fourth embodiment. FIG. 6 is similar to FIG. 2 and differs from FIG. 2 in that a step S106 is added between steps S105-S107. FIG. 7 is a flowchart showing the detail of S106 in FIG. 6. FIGS. 8A and 8B are diagrams illustrating an exemplary estimation in S106. In FIG. 8A, an example of an estimate of the output current Iout, the output voltage Vout, and the battery cell voltage Vcell is shown. In FIG. 8B, an example of an estimate of the battery temperature, a FET temperature, and a wiring temperature is shown.

Step S106 is a step of estimating the variation of the charge current Ic, the output current Vout. As shown in FIG. 4, the step S106 includes a step S106a-S106f.

In the step S106a, a joule heat and a heat radiation generated in the battery pack 100 at the time of charging are calculated. The charge/discharge controller 27 calculates the joule heat and the heat dissipation at time t0 immediately after charging starts (see FIG. 8) based on, for example, the command values CC and CV set in the step S102. The ROM 25 stores, as the setting information 25B, various types of information required for calculation of, for example, a specific heat, a heat capacity, a thermal conductivity, a resistivity, and the like of the main components of the battery pack 100. Key components referred to herein include, for example, the battery cell 10, the charge control transistor 12 and the discharge control transistor 14 (sometimes referred to collectively as a "FET"), a resistor connected to these transistors, a wiring from the charger 90 to the battery cell 10, and the like. The charge/discharge controller 27 calculates the joule heat and the heat dissipation using the current command value CC as a current, the command value CV as a voltage, and the setting information 25B in the ROM 25.

In step S106b, the temperature in the battery pack 100 is calculated. The charge/discharge controller 27 calculates the temperatures of the battery cells 10, FETs, wirings, and the like at time t0 using the joule heat, the heat radiation, and the setting information 25B calculated in the step S106a. The calculated battery temperature, FET temperature, and wiring temperature are shown in FIG. 8B, respectively.

In the step S106c, the path impedance Rpack, Rsys and the internal resistance of the battery cell 10 are calculated. The charge/discharge controller 27 calculates the path impedances Rpack, Rsys at time t0 and the internal resistance of the battery cell 10 using the temperature of each unit calculated in the step S106b and the setting information 25b.

In the step S106d, the internal voltage CellINV of the battery cell 10 and the battery cell voltage Vcell are calculated. The charge/discharge controller 27 calculates the internal voltage CellINV and the battery cell voltage Vcell at time t0 using, for example, the path impedance Rpack, Rsys calculated by the step S106c, and the information such as the internal resistance, temperature, and the like of the battery cell 10. Incidentally, the charge/discharge controller 27 may calculate the internal voltage CellINV and the battery cell voltage Vcell further using the command value CC, CV as required.

In the step S106e, the output current Iout and the output voltage Vout of the charger 90 are calculated. The charge/discharge controller 27 calculates the output current Iout (or charge current Ic) and the output voltage Vout at time t0 using the path impedance Rpack, Rsys calculated in the step S106c, the internal resistance of the battery cell 10, and the internal voltage CellINV calculated in the step S106d, the battery cell voltage Vcell, and the like.

In the step S106f, the charge/discharge controller 27 determines whether the output current Iout and the battery cell voltage Vcell calculated in the step S106e satisfy the charge termination conditions, respectively. The charge/discharge controller 27, when the battery cell voltage Vcell and the output current Iout each satisfy the charging end condition, it is finally determined that satisfies the charging end condition.

Specifically, when the calculated battery cell voltage Vcell is greater than a predetermined threshold Vpth vicinity MaxV, the charge/discharge controller 27 determines that the charge end condition is satisfied for the battery cell voltage Vcell. The threshold value Vpth may be a value smaller than the threshold value MaxV. Then, if the calculated output current Iout is smaller than a predetermined threshold Ipth, the charge/discharge controller 27 determines that satisfies the charge end condition for the output current Iout.

If at least one of the battery cell voltage Vcell and the output current Iout does not satisfy the charge end condition (No), the charge/discharge controller 27 determines that the charge end condition is not satisfied, and performs the process of the step S106a-S106e again.

In the step S106a-S106e again, for example, the calculation of the respective values at the time t1 in FIG. 8 is performed. These processes are repeatedly executed until the time tn (FIG. 8) which is estimated to be full charge satisfies the charge end condition, the time series information of each value calculated is obtained.

When both the battery cell voltage Vcell and the output current Iout satisfy the charging end condition (Yes), the charge/discharge controller 27 determines that the charge end condition is satisfied, and ends the process of the step S106.

According to FIGS. 8a and 8b, when charging is started, the battery cell voltage Vcell and the temperature of each part in the battery pack 100 increase. During that time, the output voltage Vout, the output current Iout is substantially constant. And the output current Iout is reduced at a predetermined timing after the time t3. Furthermore, the calculated output current Iout at time tn is reduced below the threshold Ipth. In the meantime, the output voltage Vout is slightly lower than the output voltage at the time of starting charge, but the output voltage is not greatly reduced.

Then, when the output current Iout is reduced, the temperature rise of each part in the battery pack 100 is substantially suppressed.

The calculated battery cell voltage Vcell rises to a voltage equal to or greater than the threshold Vpth and equal to or lower than MaxV at time t2. Thereafter, until the time t n, the calculated value of the battery cell voltage Vcell becomes a substantially constant value, or slowly increases in a range below MaxV.

The charge/discharge controller 27 transmits the output current Tout and the output voltage Vout calculated in the step S106 as a command value CC, CV respectively to the charger 90 at a predetermined timing corresponding to FIG. 8. Since the command value CV is transmitted even in the step S108 of the subsequent stage, in the step S106, only the command value CC based on the calculated output current Tout may be transmitted.

Main Effects of the Present Embodiment

According to present embodiment, since it is possible to estimate the variation of the output current Iout and the output voltage Vout from the charger 90 prior to charging starts, it is possible to set command values corresponding to the calculated output current Tout and the calculated output voltage Vout. Further, even a charger which the constant voltage charging is not available, by sending a command value CC corresponding to the calculated output current Tout, safety at the time of charging is ensured.

Incidentally, the charge/discharge controller 27 or the like measures a time defining the timing for transmitting the command values CC and CV. The measurement of the time, a counter circuit and a timer circuit (not shown) may be used, a method such as down-counting using a register or the like may be employed.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
a controller sealed in a battery pack together with a battery cell,
wherein the controller is configured to:
measure, prior to starting a charging of the battery cell, a voltage of the battery cell and an end voltage of the battery pack without measuring an output voltage of a charger;
measure a current in the battery pack;
control the charging of the battery cell of the battery pack,
wherein the controller generates, based on the voltage of the battery cell and the current in the battery pack measured prior to starting the charging of the battery cell, a voltage command value for setting an upper limit value of an output voltage of the charger to be used at a time of charging the battery cell and a current command value for setting an upper limit value of an output current of the charger to be used at the time of charging the battery cell,
wherein the upper limit value of the output voltage in the voltage command value is determined by adding 1) a maximum potential voltage that the battery cell of the battery pack can be charged maximally and 2) a voltage drop value due to i) a first path impedance between a charger and an end of the battery pack and ii) a second impedance between the end of the battery pack and the battery cell of the battery pack,
wherein the controller calculates the first path impedance between the charger and the end of the battery pack using an output voltage of the charger, an end voltage of the battery pack, and a charging current flowing through the battery pack,
wherein the controller calculates the second impedance between the end of the battery pack and the battery cell of the battery pack using the end voltage of the battery pack, a voltage of the battery cell of the battery pack, and the charging current flowing through the battery pack,
wherein, when the battery pack is connected to the charger, the controller transmits the generated voltage command value and current command value to the charger,
wherein the controller uses the generated voltage command value and current command value to instruct the charger so that the upper limit value of the output voltage output from the charger is higher than a predetermined voltage which is the maximum potential voltage that the battery cell of the battery pack can be charged maximally,
wherein the controller calculates a path impedance by adding the first and second path impedances,
wherein the controller calculates the voltage drop value by using the output voltage from the charger, the voltage of the battery cell of the battery pack, the charging current flowing through the battery pack, and the path impedance,
wherein methods of the charging include a constant current charge and a constant voltage charge, the constant current charge performing a constant current charging until the output voltage of the charger reaches the maximum potential voltage that the battery cell of the battery pack can be charged maximally, and the constant voltage charge setting the output voltage from the charger to the maximum potential voltage after the constant current charging, and then performing a constant voltage charging until the voltage of the battery cell of the battery pack is near the maximum potential voltage,
wherein, during the constant current charge, the controller updates the generated voltage command value using a predetermined value set as the first path impedance, and
wherein, during the constant voltage charge, the controller updates the generated voltage command value by updating the first path impedance by replacing the voltage command value with the output voltage of the charger.

2. The semiconductor device according to claim 1, wherein the controller periodically updates the voltage command value.

3. The semiconductor device according to claim 2, wherein the controller determines the constant current charge or the constant voltage charge by comparing a current command value based on which the upper limit value of the output current of the charger is set in the charger, the charging current, and a threshold current.

4. The semiconductor device according to claim 1, wherein the controller calculates the path impedance using the output voltage of the charger as a voltage corresponding to the voltage command value.

5. The semiconductor device according to claim 1, wherein the controller:
estimates a variation of the charging current and the output voltage before the charging starts; and
at the time of charging, updates a current command value and the voltage command value based on the estimation result of the variation of the charging current and the output voltage, the current command value.

6. The semiconductor device according to claim 5, wherein the controller estimates the variation of the charging current and the output voltage from a start of charging to an end of charging.

7. The semiconductor device according to claim 5,
wherein the controller calculates:
- a joule heat and a heat dissipation generated in the battery pack;
- a temperature in the battery pack using the calculated joule heat and heat dissipation;
- the path impedance using the calculated temperature in the battery pack; and
- an internal voltage of the battery cell of the battery pack and a voltage of the battery cell of the battery pack by using the calculated path impedance, and wherein the controller estimates the variation of the charging current and the output voltage by using the calculated internal voltage of the battery cell of the battery pack.

* * * * *